S. C. COEY.

MAGNETIC SKELP CHARGING MACHINE.

APPLICATION FILED JUNE 27, 1921.

Reissued Aug. 9, 1921. 15,175.

2 SHEETS—SHEET 1.

Inventor:
Stewart C. Coey,
by Fenning & Fenning
Attys.

S. C. COEY.

MAGNETIC SKELP CHARGING MACHINE

APPLICATION FILED JUNE 27, 1921.

Reissued Aug. 9, 1921.

15,175.

2 SHEETS—SHEET 2.

Inventor:
Stewart C. Coey,
by Banning & Banning.
Attys.

UNITED STATES PATENT OFFICE.

STEWART C. COEY, OF NEWARK, NEW JERSEY, ASSIGNOR TO THE YOUNGSTOWN SHEET & TUBE COMPANY, OF YOUNGSTOWN, OHIO.

MAGNETIC SKELP-CHARGING MACHINE.

15,175. Specification of Reissued Letters Patent. Reissued Aug. 9, 1921.

Original No. 1,019,759, dated March 12, 1912, Serial No. 668,578, filed December 29, 1911. Application for reissue filed June 27, 1921. Serial No. 480,911.

*To all whom it may concern:*

Be it known that I, STEWART C. COEY, a citizen of the United States, residing at Newark, in the county of Essex and State of New Jersey, have invented new and useful Improvements in Magnetic Skelp-Charging Machines, of which the following is a specification.

My invention relates to machines for charging skelp into heating furnaces preparatory to welding the skelp into tubes, or to bending the same into other products.

The objects of this invention are to provide a rapid, simple and positive means for charging skelp or other blanks of a magnetic or magnetizable nature into heating furnaces by the use of a magnet carried by a suitable framework or charging table having travel across the charging end of the furnace.

Referring to the accompanying drawings.

Figure 1:
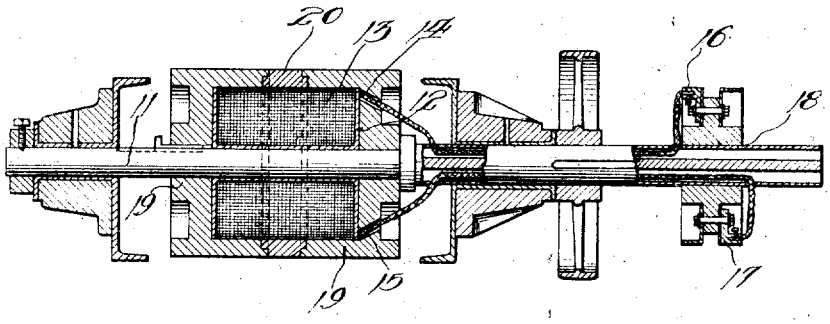
Figure 1 is a longitudinal section through the shaft on which the conveying magnet is mounted, parts being shown in elevation.
Figure 2:
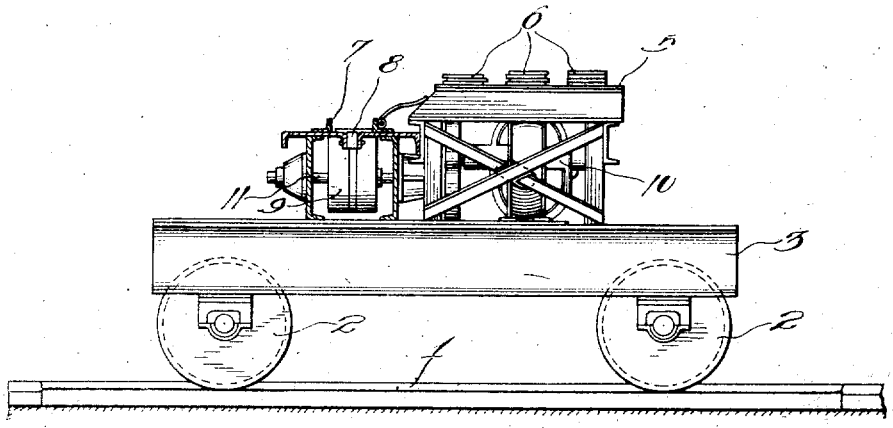
Fig. 2 is an end elevation of a structure embodying my invention.
Figure 3:
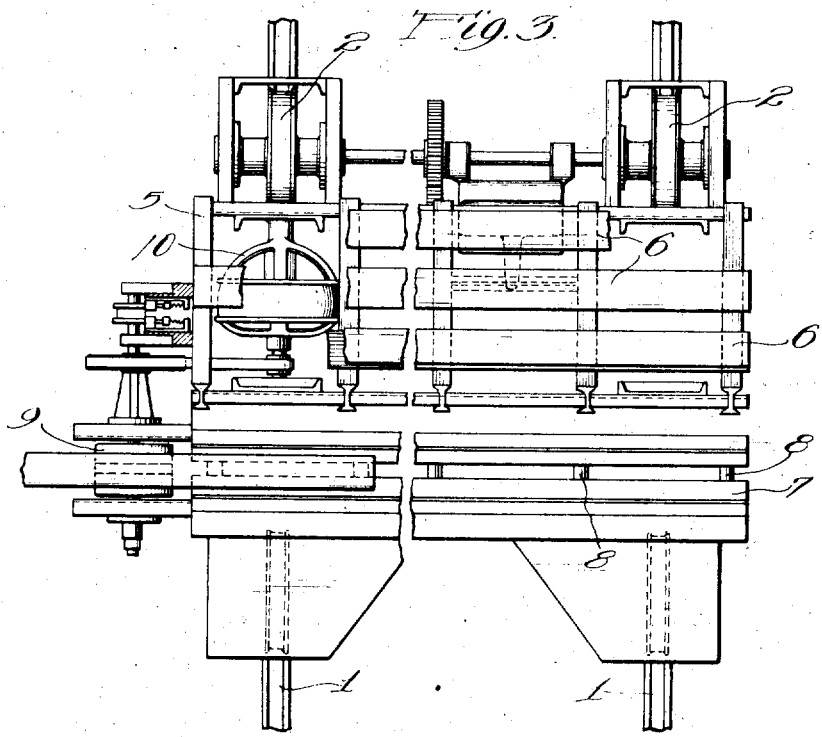
Fig. 3 is a plan of the same.
Figure 4:
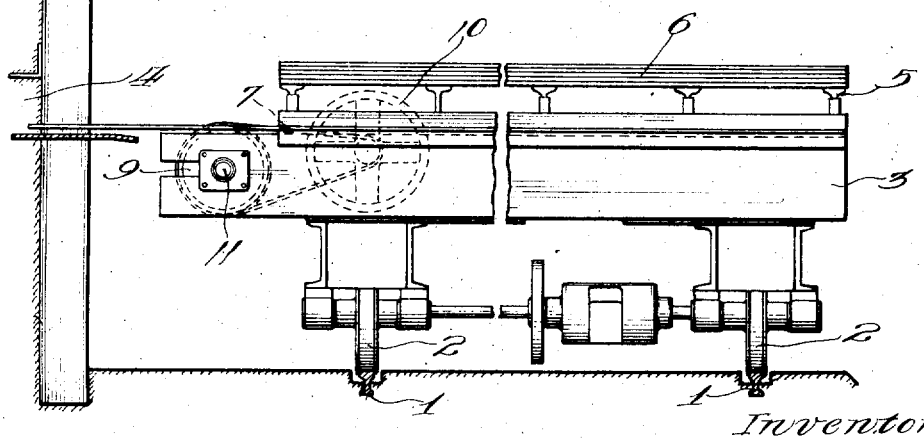
Fig. 4 is an elevation showing the end opposite that shown on Fig. 2, a portion of the furnace being shown in section.

On the drawings, 1 represents a pair of rails on which the wheels 2 of the charging table 3 travel. 4 is a portion of a heating furnace across one end of which the table 3 may travel back and forth. The top of the table has two levels, the upper or storage level 5 being the one on which the skelp 6 is piled preparatory to being transferred to the lower level. The skelp on the upper level lie parallel to the direction in which they are to be charged into the furnace. They are moved laterally by workmen or by any suitable means so as to cause them to reach their proper position on the lower level now to be described. The said lower level, which may be at any desired distance below the upper level is shown parallel to the same. It has the conveying trough or channel 7 open upwardly, there being in the bottom of the channel a number of transverse rollers 8 on which the skelp travel with but little friction during the charging operation in order to lighten the work of the charging magnet. At the end of the charging channel or bed 7 I place one or more rotary charging magnets 9 having its axis of rotation transversely of the direction in which the skelp is to be charged. The magnet preferably projects slightly above the bottom of the channel 7. The magnet is driven by the motor 10 connected thereto by suitable gearing so as to cause the top of the magnet to rotate toward the furnace 4.

11 is a suitable shaft, preferably of iron or steel, upon which I mount the core or spool 12, having thereon the coil 13 of wire. The terminals 14 and 15 of the coil lead respectively to the collector rings 16 and 17 carried by the core 18 on the shaft 11. The coil 13 and its spool 12 are inclosed in the cylindrical iron or steel cases 19 which are magnetically separated by the ring 20 of brass or other non-magnetic material, this ring being at about the center line of the skelp. The outer ends of the cases 19 are closed and connected to the shaft 11, the magnetic flux, when the magnet is idle, being along the shaft 11, radiately along the ends, and in parallel relation along the bodies of the cases 19, and across the non-magnetic gap occupied by the ring 20.

When the skelp is taken from the charging level 5 and placed in the trough 7 with one end resting on the bodies of the cases 19 and bridging the gap occupied by the brass ring 20, the magnetic flux just described is largely diverted so as to travel transversely through the skelp at and about its lines of contact with the periphery of the magnet. The rotary magnet exerts, therefore, a great tractive or adhesive effect on the skelp and causes it to be charged into the furnace at the surface velocity of the magnet. The electric motor 10 can, as is well known, be controlled so as to give the skelp such initial, final, and intermediate charging speeds as may prove best. After a skelp has been charged into the furnace, the charging table 3 is moved on the rails 1 to the desired position for charging another skelp into the furnace.

My invention dispenses with a large number of men required for the hand charging of skelp; eliminates the danger incidental to the present style of charges; and saves large losses of time and power required by said charges.

It is obvious that more than one magnet may be used at selected places along the trough, or near the magnet shown.

I claim:

1. The combination of a furnace, a charging table at one end thereof and a rotating magnetic roller having its axis below the table and having surface travel toward the furnace, said surface of the magnetic roller being arranged to be engaged by linear magnetic materials and to transfer the same to the furnace, the table being extended on one side of the magnetic roller to afford a storage space for said material prior to its delivery to the surface of the magnetic roller, substantially as described.

2. The combination of a furnace, a charging table at the end thereof, a rotary magnetic roller having its axis of rotation transverse of the table and furnace and below the supporting surface of the table, the magnetic roller being arranged so that the part thereof which rotates toward the furnace may be engaged by linear magnetizable material, and the charging table being extended laterally of the roller and elevated to afford an upper storage level for the support of said magnetic material prior to its delivery to the underlying roller, substantially as described.

3. The combination of a table and a rotary magnet supported thereon and having its axis of rotation below the surface of the table and having its periphery projecting slightly above the table, the rotary magnet having its magnetic circuit interrupted circumferentially so that the interrupted magnetic circuit may be bridged by magnetizable material to be conveyed by the magnet, and the table being extended laterally to afford a storage space for said material prior to its delivery into contact with the rotary magnet, substantially as described.

4. The combination of a table, a trough thereon and a rotary magnet supported by the table and having its axis of rotation transverse of the trough, and the upper portion of its periphery projected into the trough in position to be engaged by a section of magnetizable material in the trough, the table being provided with an upper storage level to receive sections of magnetizable material preparatory to their delivery to the underlying roller, and their advancement through the trough; substantially as described.

5. The combination of a furnace, a charging table at the end thereof mounted to travel transversely in front of the furnace, a rotating magnet having its axis of rotation transverse of the table and furnace and below the supporting surface of the table, the periphery of the rotating magnet being projected above the table surface to impart rotation toward the furnace of magnetizable material laid thereupon, means for guiding the magnetizable material in its travel toward the furnace, the table comprising an upper storage level adapted for the support of sections of material in parallel relation to the line of feed and laterally thereof, in preparation for their manual discharge one at a time downwardly and laterally upon the surface of the roller, substantially as described.

STEWART C. COEY.